United States Patent
Shan

(10) Patent No.: US 11,140,047 B2
(45) Date of Patent: Oct. 5, 2021

(54) NETWORK DATA ANALYTICS FUNCTION (NWDAF) INFLUENCING FIFTH GENERATION (5G) QUALITY OF SERVICE (QOS) CONFIGURATION AND ADJUSTMENT

(71) Applicant: Intel Corporation, Santa Clara, CA (US)

(72) Inventor: Changhong Shan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/365,446

(22) Filed: Mar. 26, 2019

(65) Prior Publication Data

US 2019/0222489 A1 Jul. 18, 2019

Related U.S. Application Data

(60) Provisional application No. 62/654,916, filed on Apr. 9, 2018.

(51) Int. Cl.
*G06F 15/173* (2006.01)
*H04L 12/24* (2006.01)
*H04L 12/14* (2006.01)
*H04M 15/00* (2006.01)
(Continued)

(52) U.S. Cl.
CPC ...... *H04L 41/5009* (2013.01); *H04L 12/1407* (2013.01); *H04L 41/0893* (2013.01); *H04L 41/5032* (2013.01); *H04M 15/66* (2013.01); *H04M 15/8016* (2013.01); *H04M 15/8022* (2013.01); *H04M 15/8033* (2013.01); *H04M 15/8044* (2013.01); *H04W 4/24* (2013.01);
(Continued)

(58) Field of Classification Search
None
See application file for complete search history.

(56) References Cited

U.S. PATENT DOCUMENTS

2013/0072222 A1* 3/2013 Weill .............. H04W 64/00 455/456.1
2014/0211648 A1* 7/2014 Rah Mati .......... H04W 48/12 370/252

(Continued)

FOREIGN PATENT DOCUMENTS

WO WO-2018104579 A1 * 6/2018 ........ H04W 36/0033

OTHER PUBLICATIONS

3GPP, "Technical Specification Group Services and System Aspects; Policy and Charging Control Framework for the 5G System; Stage 2 (Release 15)," 3GPP TS 23.503 V15.1.0 (Mar. 2018), 5G, 65 pages.

(Continued)

*Primary Examiner* — Phyllis A Book
(74) *Attorney, Agent, or Firm* — Schwabe, Williamson & Wyatt, P.C.

(57) ABSTRACT

Embodiments of the present disclosure describe methods, apparatuses, storage media, and systems for utilizing network data analytics function (NWDAF) to influence fifth generation (5G) quality of service (QoS) configuration and adjustment. Various embodiments enable NWDA-assisted QoS provisioning, NWDA-assisted determination of policy, and NWDA-assisted QoS adjustment. Other embodiments may be described and claimed.

20 Claims, 10 Drawing Sheets

(51) Int. Cl.
  *H04W 4/24* (2018.01)
  *H04W 24/00* (2009.01)
(52) U.S. Cl.
  CPC ......... *H04W 24/00* (2013.01); *H04L 41/5025* (2013.01)

(56) References Cited

U.S. PATENT DOCUMENTS

| | | | | |
|---|---|---|---|---|
| 2014/0241247 | A1* | 8/2014 | Kempf | H04L 12/4641 370/328 |
| 2017/0317894 | A1* | 11/2017 | Dao | H04L 41/5012 |
| 2017/0332282 | A1* | 11/2017 | Dao | H04W 72/087 |
| 2018/0192471 | A1* | 7/2018 | Li | H04W 4/50 |
| 2018/0227872 | A1* | 8/2018 | Li | H04W 76/20 |
| 2018/0262924 | A1* | 9/2018 | Dao | H04W 72/1257 |
| 2019/0053308 | A1* | 2/2019 | Castellanos Zamora | H04L 65/1073 |
| 2019/0068625 | A1* | 2/2019 | Alfano | H04L 43/062 |
| 2019/0069199 | A1* | 2/2019 | Yan | H04W 28/0268 |

OTHER PUBLICATIONS

3GPP, "Technical Specification Group Services and System Aspects; Study of Enablers for Network Automation for 5G; (Release 16)," 3GPP TR 23.791 V0.2.0 (Mar. 2018), 5G, 13 pages.

3GPP, "Technical Specification Group Services and System Aspects; Architecture enhancements to facilitate communications with packet data networks and applications (Release 15)," 3GPP TS 23.682 V15.4.0 (Mar. 2018), 5G, 124 pages.

3GPP, "Technical Specification Group Services and System Aspects; System Architecture for the 5G System; Stage 2 (Release 15)," 3GPP TS 23.501 V15.1.0 (Mar. 2018), 5G, 201 pages.

3GPP, "Technical Specification Group Services and System Aspects; Procedures for the 5G System; Stage 2 (Release 15)," 3GPP TS 23.502 V15.1.0 (Mar. 2018), 5G, 285 pages.

* cited by examiner

NETWORK DATA ANALYTICS FUNCTION (NWDAF) INFLUENCING FIFTH GENERATION (5G) QUALITY OF SERVICE (QOS) CONFIGURATION AND ADJUSTMENT

CROSS REFERENCE TO RELATED APPLICATION

The present application claims priority to U.S. Provisional Patent Application No. 62/654,916, filed Apr. 9, 2018, entitled "Network Data Analytics Function (NWDAF) Influencing Fifth Generation (5G) Quality of Service (QoS) Configuration and Adjustment," which is hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

NWDAF may serve use cases belonging to different domains, such as QoS, traffic steering, dimensioning, or security. New use cases related to 5G QoS have been identified, for example, network data analytics (NWDA) assisted QoS provisioning, NWDA-assisted determination of policy, and NWDA-assisted QoS adjustment. Thus, new solutions are needed for NWDAF influencing QoS configuration and adjustment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
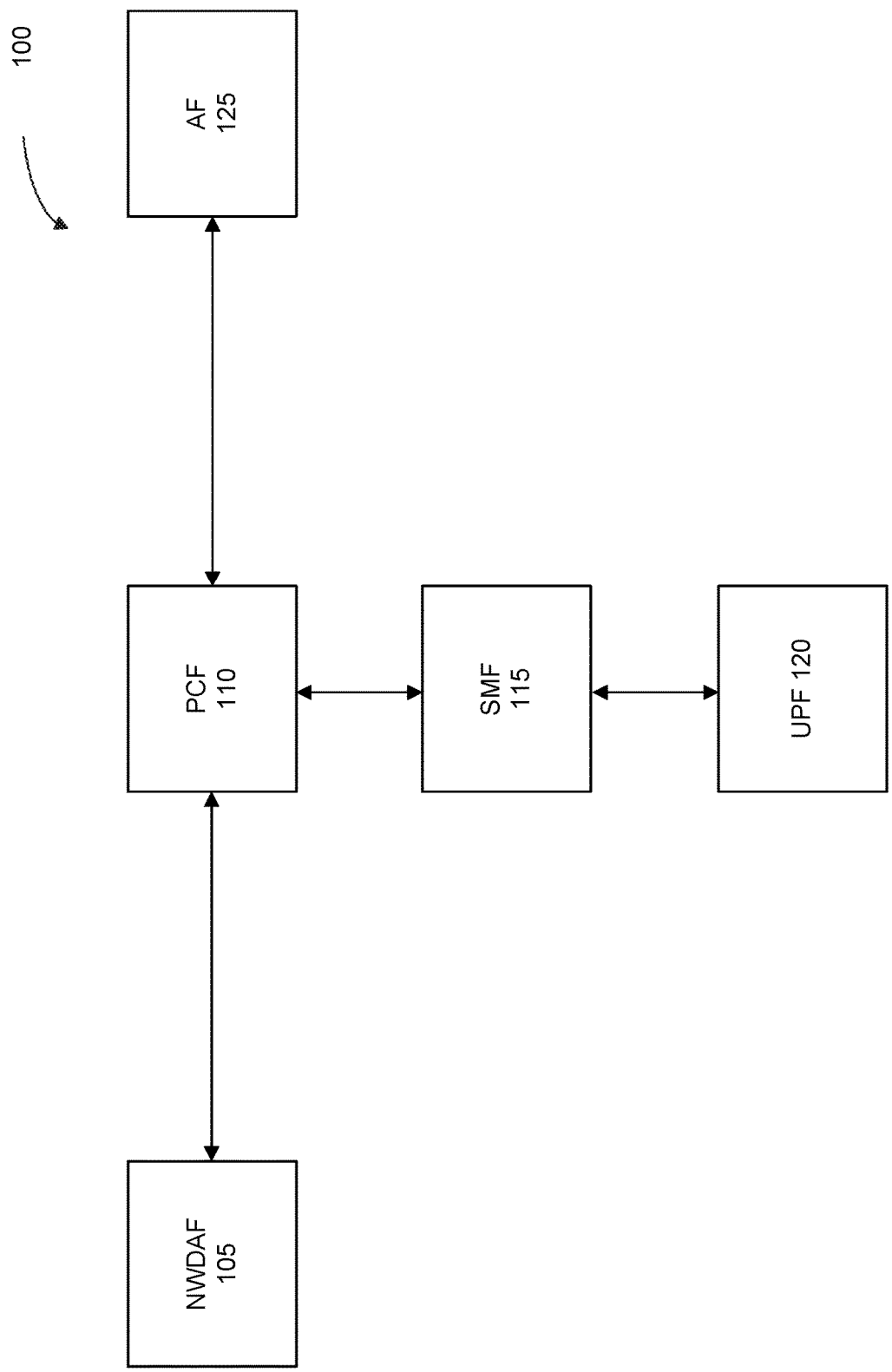
FIG. 1 schematically illustrates a portion of a Fifth Generation System (5GS) in a reference point architecture, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In Fifth Generation Systems (5GS), a network data analytics function (NWDAF) may be used for data collection and data analytics in a centralized manner or for edge computing. The NWDAF may utilize service-based interfaces to communicate with other Fifth Generation Core (5GC) network functions (NFs). The interactions between the NF(s) and the NWDAF may take place in a local public land mobile network (PLMN) (e.g., between the reporting NF and the NWDAF belong to the same PLMN).

The NFs may decide how to use the data analytics provided by the NWDAF to improve network performance. In various implementations, the NWDAF may provide slice specific network data analytics to a policy control function (PCF) and a network slice selection function (NSSF). In addition, the NWDAF may provide network data analytics (e.g., load level information) to the PCF and the NSSF on a network slice level, and the NWDAF may not be required to be aware of the current subscribers using the slice. The NWDAF may notify/publish slice specific network status analytic information to subscribing/subscriber PCF(s) and the NSSF. In this way, these PCF(s) and NSSF may directly collect slice specific network status analytic information from the NWDAF, although this information may not be subscriber specific. The PCF may use that data in its policy decisions, and the NSSF may use the load level information provided by NWDAF for slice selection.

Various use cases related to 5G QoS configuration defined in third generation partnership project (3GPP) technical report (TR) 23.791 (TR 23.791 v0.2.0, 2018-3) may have a key issue of NWDAF influencing QoS configuration and adjustment. Such use cases may include, but not be limited to, NWDA-assisted QoS provisioning, NWDA-assisted determination of policy, and NWDA-assisted QoS adjustment. Various embodiments herein describe what information an NWDAF may provide to a PCF or other functions, how the NWDAF may communicate with the PCF, and how the PCF may utilize the information.

FIG. 1 illustrates a portion of a 5GS network 100 in a reference point architecture. An NWDAF 105 may represent operator managed network analytics logical function. The NWDAF 105 may provide slice specific network data analytics to a PCF 110. The NWDAF 105 may provide network information (for example, load and delay information) to the PCF 110 on a network slice instance level, and the NWDAF 105 may not be required to be aware of the current subscribers using the slice. The NWDAF 105 may notify slice specific network status analytic information to the PCF 110 that is subscribed to it. The PCF 110 may collect directly slice specific network status analytic information from the NWDAF 105. This information may not be subscriber specific.

The PCF 110 may support unified policy framework to govern network behaviour, provide policy rules to control plane function(s) to enforce them, and/or access subscription information relevant for policy decisions in a unified data repository (UDR).

In some embodiments, the PCF 110 may be an NSSF instead. An NSSF is a network function that may support functionalities of, but is not limited to, selecting the set of network slice instances serving the user equipment (UE), determining the allowed network slice selection assistance information (NSSAI) and the mapping to the subscribed single-NSSAIs (S-NSSAIs), determining the configured NSSAI and the mapping to the subscribed S-NSSAIs, and determining the AMF set to be used to serve the UE, or, based on configuration, a list of candidate AMF(s), possibly by querying an NF repository function (NRF).

In some embodiments, both a PCF and NSSF may be consumers of network analytics. The PCF 110 may use that data in its policy decisions. NSSF may use the load level information provided by NWDAF for slice selection.

In non-roaming reference point architecture of a network 100, as illustrated in FIG. 1, The NWDAF 105 may request a service operation to the PCF 110 or notify the PCF 110 with certain information. The PCF 110 may respond a request by the NWDAF 105 or request subscription to the NWDAF 105 for network analytics information. The communication between the NWDAF 105 and PCF 110 may be via an Npcf interface and Nnwdaf interface.

An NWDAF request may be used for influencing a session management function (SMF) 115 in the network. The SMF 115 may provide session management, such as session establishment, modify, and release; UE internet protocol (IP) address allocation and management; configuration of traffic steering at user plane function (UPF) to route traffic to proper destination; termination of interfaces towards PCFs; charging data collection and support of charging interfaces; downlink data notification; and some other functionalities.

A UPF 120 may interact with the SMF 115 and provide functionalities of packet routing and forwarding, packet inspection, traffic usage reporting, QoS handling for user plane, uplink traffic verification, transport level packet marking in uplink and downlink, downlink packet buffering and downlink data notification triggering, and some other functionalities.

An AF 125 may interact with the PCF 110 for policy control and support application influence on traffic routing. Depending on operator deployment, AFs may be trusted by the operator with direct interaction with relevant network functions.

Figure 2:
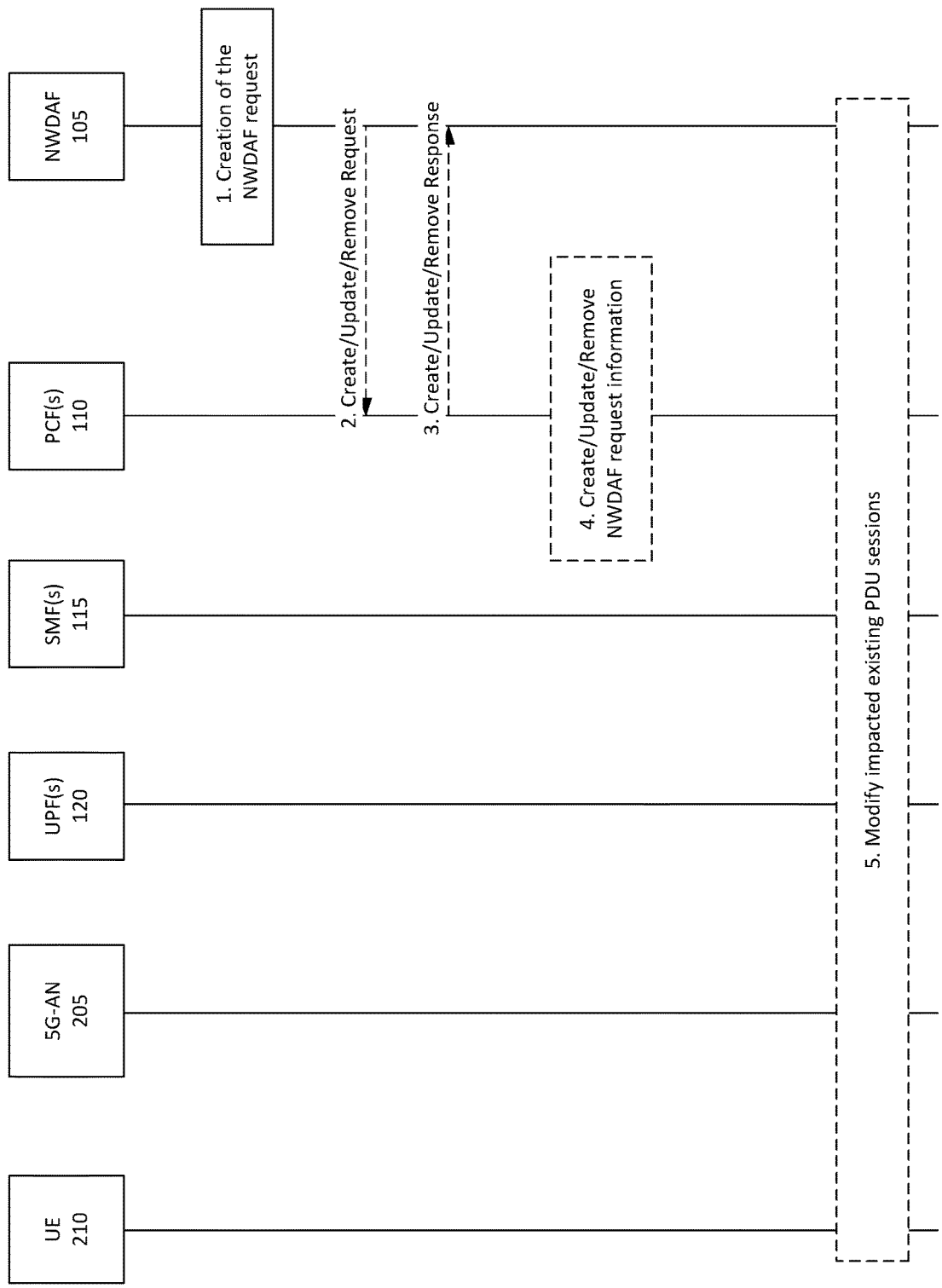
FIG. 2 illustrates an example procedure of influencing edge computing involving a network data analytics function (NWDAF), as well as how a policy control function (PCF) may utilize the information received from the NWDAF in accordance with some embodiments.

FIG. 2 illustrates an example procedure of influencing edge computing involving the NWDAF 105, as well as how the PCF 110 may utilize the information received from the NWDAF. In various embodiments, at operation 1, the NWDAF 105 may create a new request by invoking a request service operation to the NWDAF 105. The request may be commanded as, for example, Npcf_PolicyAuthorization_Create Request. The request service operation may include creating a new NWDAF transaction identifier (ID) so that the NWDAF 105 may update or remove the request service operation as to influence traffic routing. The newly created NWDAF transaction ID may correspond to one or more protocol data unit (PDU) sessions. To update or remove an existing request, the NWDAF 105 may invoke a different service operation, Npcf_PolicyAuthorization_Update service operation, to do so.

At operation 2, the NWDAF 105 may transmit its request to the PCF 110 directly by invoking, for example Npcf_PolicyAuthorization_Create Request or Npcf_PolicyAuthorization_Update Request service operation, to create the request or update the request.

At operation 3, the PCF 110 may respond by invoking a command, for example, Npcf_PolicyAuthorization_Create Response or Npcf_PolicyAuthorization_Update Response service operation.

At operation 4, the PCF 110 may create NWDAF information based on the request. The PCF 110 may update or remove previously existing NWDAF information with respect to the same PDU session(s) based on the newly created request, if there has been existing NWDAF information.

At operation 5, the PCF 110 may determine if existing PDU sessions are impacted by the NWDAF request. The impact may concern a 5G access node (AN) 205, a UE 210, and/or some functions in the network, such as the SMF 115, UPF 120, and other functions in the network. For each of these PDU sessions that are impacted based on the PCF determination, the PCF110 may initiate a network initiated PDU session modification procedure as defined in clause 4.3.3.2 and 4.3.3.3 of 3GPP technical specification (TS) 23.502 (TS 23.502 v15.1.0, 2018-3).

As above discussed, the NWDAF 105 may provide the NWDAF request to the PCF 110. The NWDAF request may be used for influencing SMF routing decisions. The NWDAF request may include information for identifying where and when a specific data trafficking is subject to certain routing handling. Such routing handling may be for edge computing or other purposes. The NWDAF 105 may acquire the information by subscribing to other functions (e.g., AF and UPF) in the network 100 and/or requesting to access nodes (e.g., gNB) in the network. Alternatively or additionally, the NWDAF 105 may acquire the information by collecting load and/or delay information from corresponding network functions. The NWDAF request may include, but is not limited to, information as follows.

A. Information to identify traffic. The information may include a data network name (DNN), which may carry the same meaning as access point name (APN) to select an SMF and UPF(s) for a PDU session, and possible slicing information, such as single network slice selection assistance information (S-NSSAI). Alternatively, an AF-service identifier may be used to identify traffic associated with the PDU session. The AF-service identifier may be an identifier of the service whose request is issued by the AF. In accordance, a 5G core (5GC) may map this identifier into a target DNN and slicing information (e.g., S-NSSAI).

In embodiments, the information may include an application identifier or traffic filtering information. Such information may be a unique identifier of a PDU session in a PCF and may be based on multiple tuple, for example, 3 or 5 Tuple. The application identifier may refer to an application handling user plane traffic and be used by a corresponding UPF to detect the traffic of the application.

B. Temporal validity condition. A temporal validity condition may indicate when the traffic routing is to apply, when an AF request is used for influencing SMF routing decisions to a specific traffic. In some embodiments, the temporal validity condition may indicate one or more time periods to apply to a corresponding traffic.

C. Spatial validity condition. A spatial validity condition may indicate where the traffic routing is to apply with respect to one or more UE locations, when an AF request is used for influencing SMF routing decisions to a specific traffic.

D. NWDAF transaction identifier (ID). An NWDAF transaction ID may be used to update or remove the NWDAF request to influence corresponding traffic routing.

E. Information regarding UE. A number of pieces of information with respect to individual UEs or groups of UEs may be included in the NWDAF request. For an individual UE, the information may include an identified generic public subscription identifier (GPSI) or an internet protocol (IP) address or prefix with respect to the UE. For a group of UEs that is identified by an external-group identifier or internal-group identifier, either of the identifiers may be used. It is noted that the external-group identifier may be as defined in 3GPP TS 23.682 (TS 23.682 v15.4.0, 2018-3). The internal-group identifier may be as defined in 3GPP TS 23.501 (TS 23.501 v15.1.0, 2018-3). Alternatively or additionally, for any UEs that access a combination of DNN and S-NSSAI, an NWDAF request may include corresponding DNN and S-NSSAI information regarding slicing information.

F. QoS parameters. Standardized 5G QoS indicator (5QI) and non-standardized 5QI may be included in the NWDAF request. Non-standardized 5QI may include, but is not limited to, information with respect to data transmission as follows:

1. Resource type, which may be guaranteed bit rate (GBR) or non-GBR.
2. Default priority level, which may be represented by an integer to indicate the default priority level. An example of quality class identifier (QCI) may have nine priority levels.
3. Packet delay budget, which may be defined in milliseconds.
4. Packet error rate.
5. Default maximum data burst volume.
6. Default averaging window.

In addition, quality of experience (QOE) is a measure focusing on the entire service experience and refers to a holistic concept of performance. Mean opinion score (MOS) is a measure used in the domain of QOE and telecommunications engineering, representing overall quality of a stimulus or system. MOS may be used as part or all of the QoS measuring as well.

Figure 3:
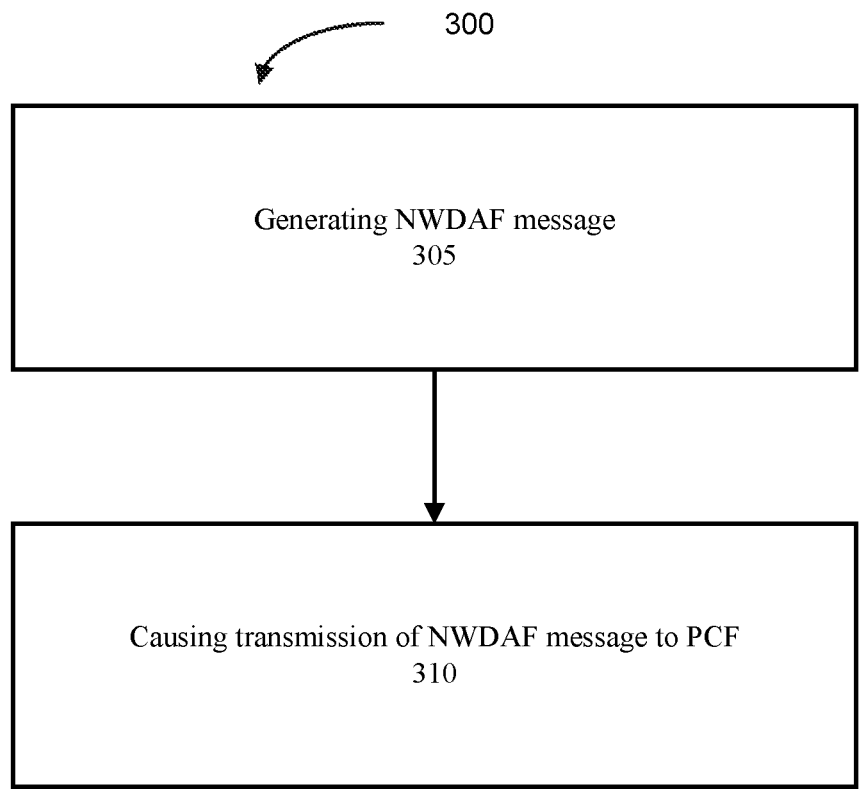
FIG. 3 illustrates an operation flow/algorithmic structure to influence 5G QoS configuration and adjustment by an NWDAF, in accordance with some embodiments.

FIG. 3 illustrates an operation flow/algorithmic structure 300 in accordance with some embodiments. The operation flow/algorithmic structure 300 may be part of a procedure of influencing 5G QoS configuration and adjustment that is enabled by an NWDAF. In some embodiments, the procedure may be similar to that shown and described with respect to FIG. 2.

At 305, the operation flow/algorithmic structure 300 may include generating an NWDAF message. In various embodiments, the generated NWDAF message may be similar to and substantially interchangeable with the NWDAF request of FIG. 2, which includes information to identify traffic, temporal validity condition, spatial validity condition, NWDAF transaction ID, QoS parameters, and/or information regarding UE. For example, the NWDAF message may include information to indicate a temporal validity condition that corresponds to a time reference to apply a traffic routing with respect to a PDU session and/or spatial validity condition that corresponds to a location reference to which the traffic routing is applied with respect to the PDU session. The temporal validity condition and spatial validity condition may be based on an AF request for influencing an SMF routing decision with respect to the PDU session. The PDU session may contain the data to be transmitted and identified by an AF and be under management of an SMF.

The NWDAF message may be generated by the NWDAF 105. In some embodiments, the NWDAF message may be generated initially to notify the PCF 110 regarding relevant information. The relevant information may be subscribed or request by the PCF 110. In some embodiments, the NWDAF message may be generated in response to a PCF request or subscription. In some embodiments, the NWDAF message may be generated as an NWDAF request to the PCF 110 seeking for a PCF response.

At 310, the operation flow/algorithmic structure 300 may include causing transmission of the NWDAF message to the PCF 110. In some embodiments, the transmission may be in response to a request or subscription by the PCF 110. In other embodiments, the transmission may be a request initiated by the NWDAF 105.

Figure 4:
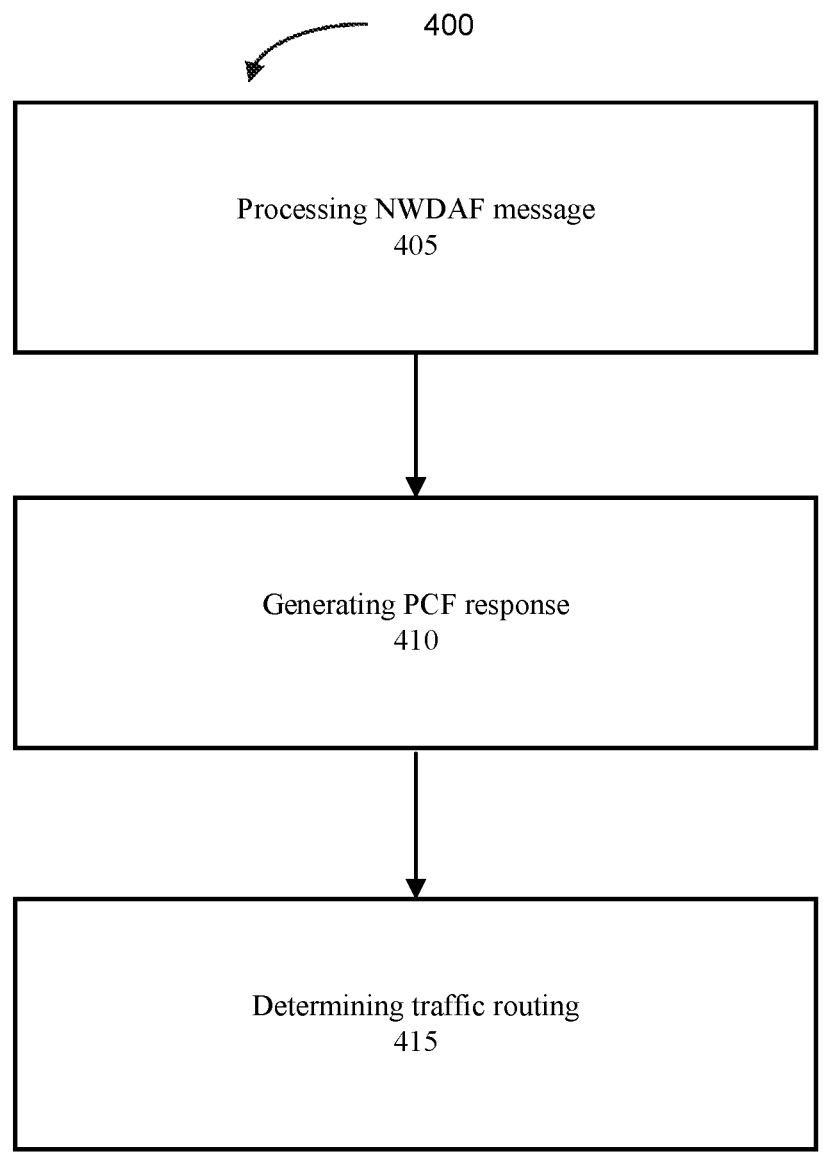
FIG. 4 illustrates the operation flow/algorithmic structure to influence 5G QoS configuration and adjustment by a PCF, in accordance with some embodiments.

FIG. 4 illustrates an operation flow/algorithmic structure 400 in accordance with some embodiments. The operation flow/algorithmic structure 400 may be part of the procedure of influencing 5G QoS configuration and adjustment that is enabled by a PCF. In some embodiments, the procedure may be similar to that shown and described with respect to FIG. 2.

At 405, the operation flow/algorithmic structure 400 may include processing the NWDAF message that is generated at 305. Depending on the information in the NWDAF message, the PCF 110 may process correspondingly. For example, if the NWDAF message includes temporal and spatial validity conditions regarding a PDU session, the PCF 110 may identify such information indicated by the NWDAF 105 upon receiving the NWDAF message. In some embodiments, the operation flow/algorithmic structure 400 may further include receiving the NWDAF message. In some embodiments, the operation flow/algorithmic structure 400 may further include generating a request or subscription for the NWDAF message and transmitting the request or subscription to the NWDAF 105.

At 410, the operation flow/algorithmic structure 400 may include generating a PCF response to the NWDAF based on the NWDAF message. Such a response may be to create, remove, or update corresponding information with respect to the PDU session. In some embodiments, the PCF 110 may invoke dedicated commands, as discussed in FIG. 2, to create, remove, or update service operation at NWDAF 105. Details of particular service operation may be associated with the information indicated by the NWDAF message.

At 415, the operation flow/algorithmic structure 400 may include determining traffic routing of an SMF with respect to the PDU session based on the identified temporal and spatial validity conditions. It is noted that such performing traffic routing of the SMF may be based on a variety of information indicated by the NWDAF message. Some or all of the information indicated by the NWDAF message may be used in the traffic routing determination. In some embodiments, the determination of traffic routing of the SMF may include determining whether the PDU session is impacted by the validity conditions based on the NWDAF message. If it is determined that the PDU session is to be impacted by the validity conditions, the PCF 110 may request a network initiated PDU session modification procedure to modify the SMF with respect to the PDU session. In accordance, the PCF 110 may process to modify the SMF with respect to the PDU session that is to be impacted. The procedure of this modification may be the same or substantially similar to the network requested PDU session modification procedure defined in Clause 4.3.3.2 and 4.3.3.3 in 3GPP TS 23.502. (TS 23.502 v15.1.0, 2018-3.)

Figure 5:
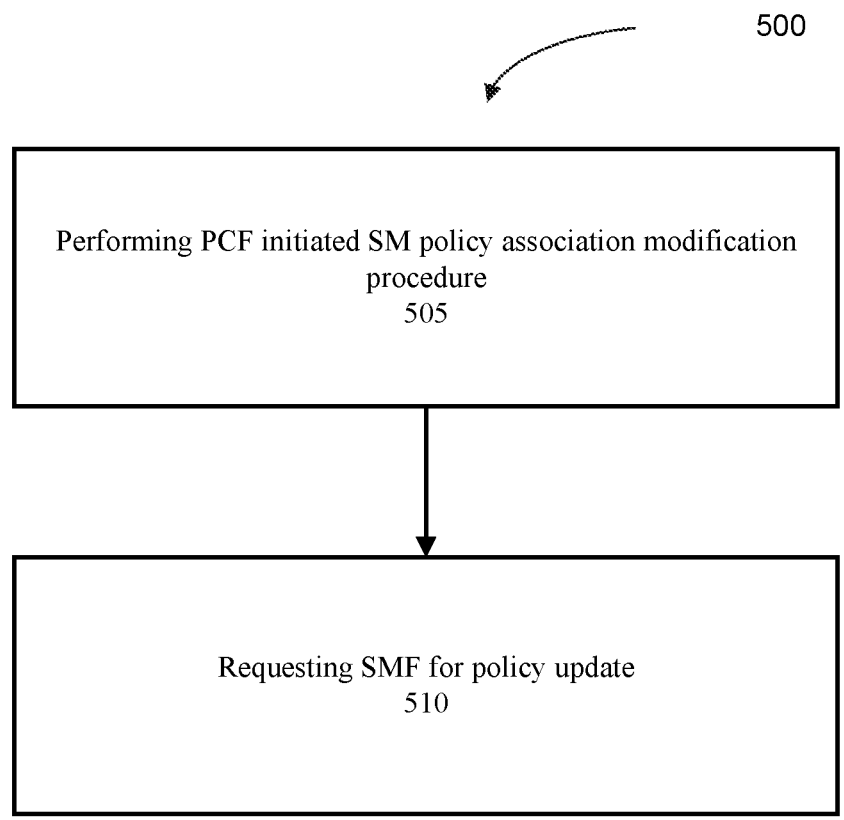
FIG. 5 illustrates another operation flow/algorithmic structure in accordance with some embodiments.

FIG. 5 illustrates an operation flow/algorithmic structure 500 in accordance with some embodiments. The operation flow/algorithmic structure 500 may be part of the procedure of initiating the network initiated PDU session modification procedure by the PCF 110. In some embodiments, the procedure may be similar to that shown and described with respect to FIG. 2 at operation 5.

At 505, the operation flow/algorithmic structure 500 may include performing a PCF initiated session management (SM) policy association modification procedure. The PCF initiated SM policy association modification procedure may be triggered by a policy decision.

At 510, the operation flow/algorithmic structure 500 may include requesting SMF for a policy update with respect to the PDU session. The PCF 110 may transmit such a request with updated policy information with respect to the PDU session.

The following figures describe systems, devices, and components that may implement various embodiments described herein. Like named elements may be substituted for one another.

Figure 6:
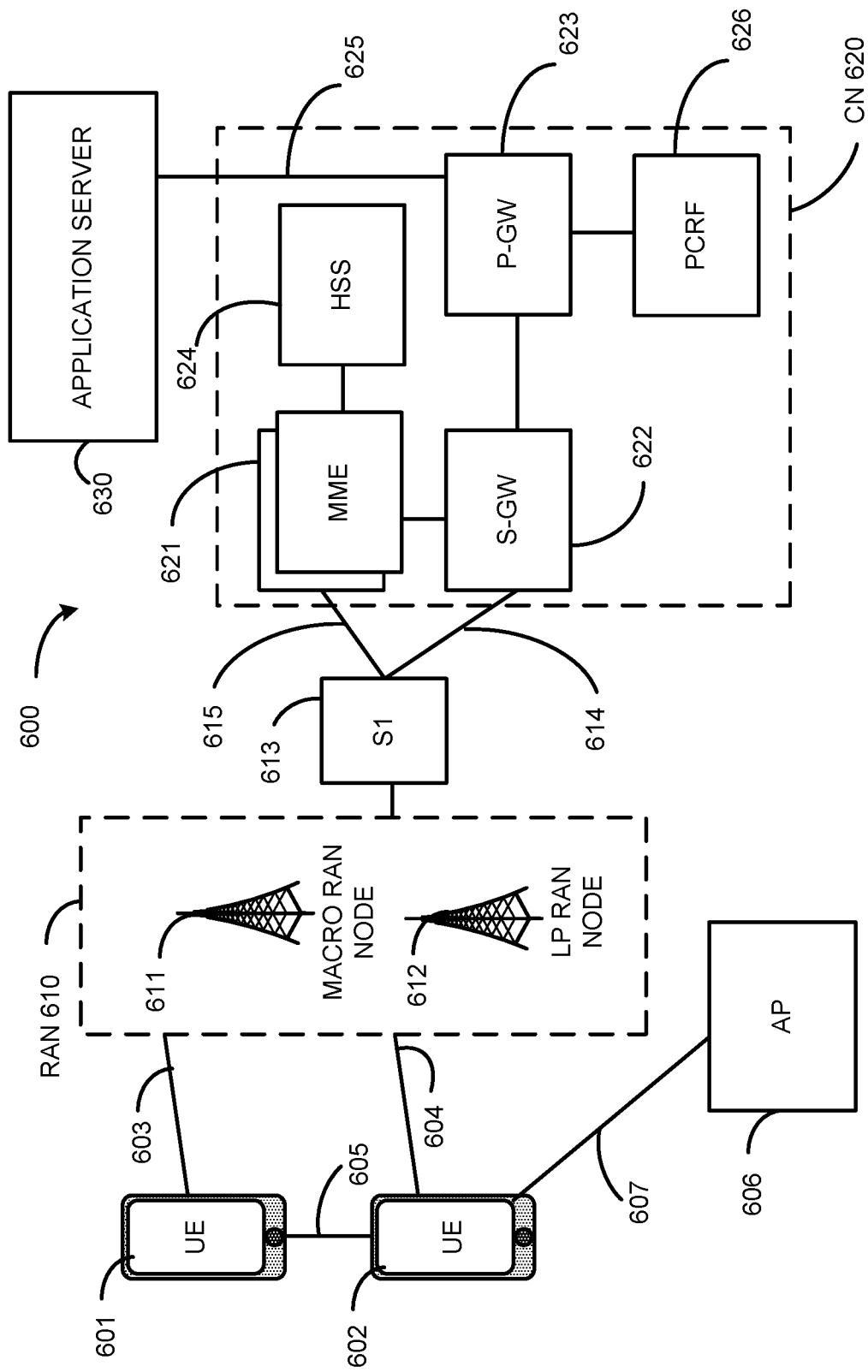
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. As used herein, the term "user equipment" or "UE" may refer to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 601 and 602 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, and/or the like.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections (or channels) 603 and 604, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 605 may be used in vehicular applications and communications technologies, which are often referred to as V2X systems. V2X is a mode of communication where UEs (for example, UEs 601, 602) communicate with each other directly over the PC5/SL interface 605 and can take place when the UEs 601, 602 are served by RAN nodes 611, 612 or when one or more UEs are outside a coverage area of the RAN 610. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 601, 602, RAN nodes 611, 612, application servers 630, and pedestrian UEs 601, 602 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 601, 602 may be implemented/employed as Vehicle Embedded Communications Systems (VECS) or vUEs.

The UE 602 is shown to be configured to access an access point (AP) 606 (also referred to as also referred to as "WLAN node 606", "WLAN 606", "WLAN Termination 606", or "WT 606" or the like) via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below). In various embodiments, the UE 602, RAN 610, and AP 606 may be configured to utilize LTE-WLAN aggregation (LWA) operation and/or WLAN LTE/WLAN Radio Level Integration with IPsec Tunnel (LWIP) operation. The LWA operation may involve the UE 602 in RRC CONNECTED being configured by a RAN node 611, 612 to utilize radio resources of LTE and WLAN. LWIP operation may involve the UE 602 using WLAN radio resources (e.g., connection 607) via Internet Protocol Security (IPsec) protocol tunneling to authenticate and encrypt packets (e.g., internet protocol (IP) packets) sent over the connection 607. IPsec tunneling may include encapsulating entirety of original IP packets and adding a new packet header, thereby protecting the original header of the IP packets.

The RAN 610 can include one or more access nodes that enable the connections 603 and 604. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU" and an RSU implemented in or by an eNB may be referred to as an "eNB-type RSU." The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620 via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the S-GW 622 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
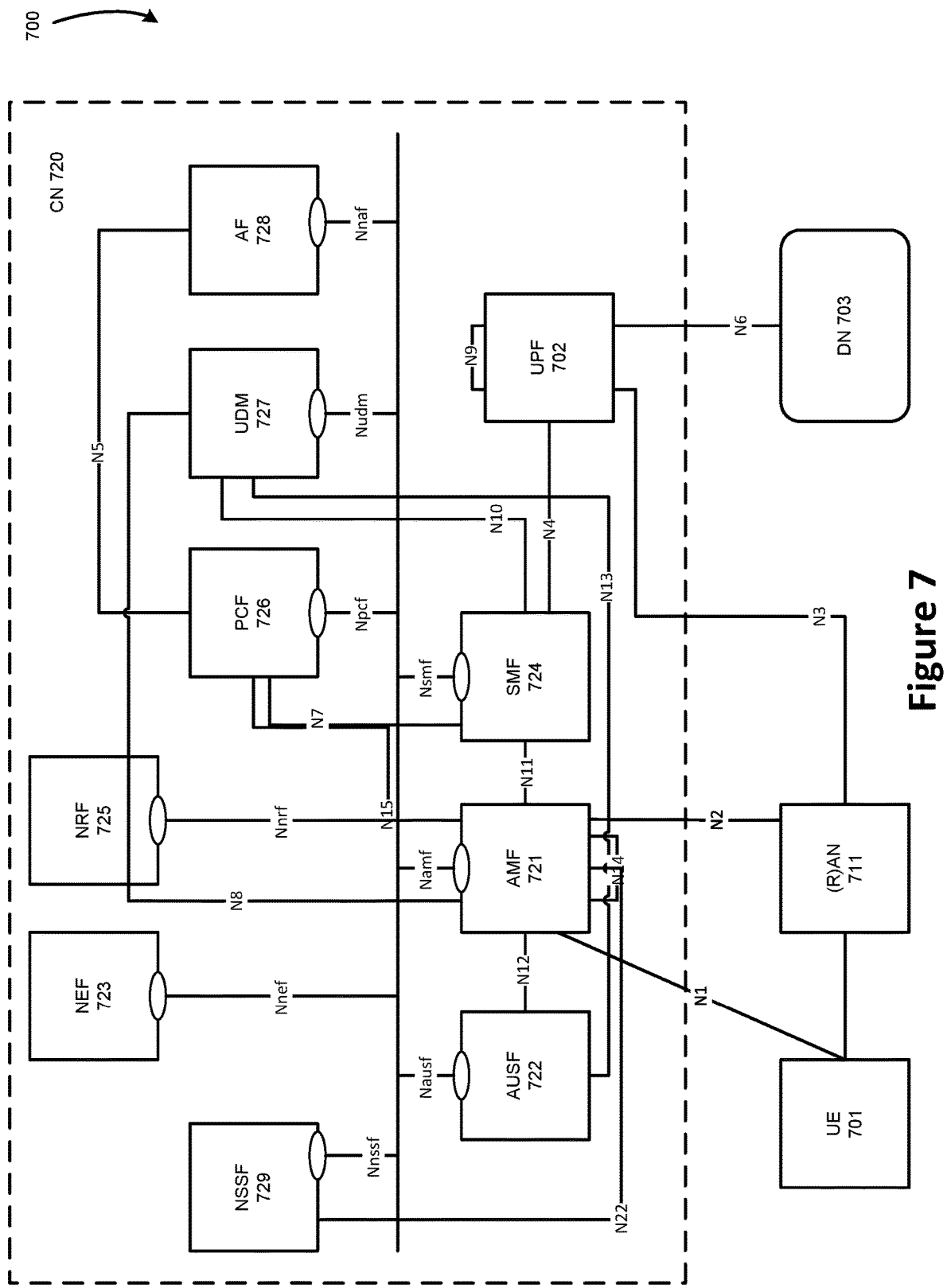
FIG. 7 illustrates another architecture of a system of a network in accordance with some embodiments.

FIG. 7 illustrates an architecture of a system 700 of a network in accordance with some embodiments. The system 700 is shown to include a UE 701, which may be the same or similar to UEs 601 and 602 discussed previously; a RAN node 711, which may be the same or similar to RAN nodes 611 and 612 discussed previously; a data network (DN) 703, which may be, for example, operator services, Internet access or 3rd party services; and a 5G Core Network (5GC or CN) 720.

The CN 720 may include an Authentication Server Function (AUSF) 722; an Access and Mobility Management Function (AMF) 721; a Session Management Function (SMF) 724; a Network Exposure Function (NEF) 723; a Policy Control Function (PCF) 726; a Network Function (NF) Repository Function (NRF) 725; a Unified Data Management (UDM) 727; an Application Function (AF) 728; a User Plane Function (UPF) 702; and a Network Slice Selection Function (NSSF) 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, perfomr packet inspection, enforce user plane part of policy rules, lawfully intercept packets (UP collection); perform traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. DN 703 may include, or be similar to, application server 630 discussed previously. The UPF 702 may interact with the SMF 724 via an N4 reference point between the SMF 724 and the UPF 702.

The AUSF 722 may store data for authentication of UE 701 and handle authentication related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for an N11 reference point between the AMF 721 and the SMF 724. The AMF 721 may provide transport for Session Management (SM) messages between the UE 701 and the SMF 724, and act as a transparent proxy for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface, which may include or be an N2 reference point between the (R)AN 711 and the AMF 721; and the AMF 721 may be a termination point of NAS (N1) signalling, and perform NAS ciphering and integrity protection.

AMF 721 may also support NAS signalling with a UE 701 over an N3 interworking-function (IWF) interface. The N3IWF may be used to provide access to untrusted entities. N3IWF may be a termination point for the N2 interface between the (R)AN 711 and the AMF 721 for the control plane, and may be a termination point for the N3 reference point between the (R)AN 711 and the UPF 702 for the user plane. As such, the AMF 721 may handle N2 signalling from the SMF 724 and the AMF 721 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-Equipment Identity Register (5G-EIR) (not shown by FIG. 7).

The SMF 724 may be responsible for session management (e.g., session establishment, modify and release, including tunnel maintain between UPF and AN node); UE IP address allocation and management (including optional authorization); selection and control of UP function; configuring traffic steering at UPF to route traffic to proper destination; termination of interfaces towards policy control functions; controlling part of policy enforcement and QoS; lawful intercept (for SM events and interface to LI system); termination of SM parts of NAS messages; downlink Data Notification; initiation of AN specific SM information, sent via AMF 721 over N2 to (R)AN 711; and determining SSC mode of a session. The SMF 724 may include the following roaming functionality: handle local enforcement to apply QoS SLAB (VPLMN); charging data collection and charging interface (VPLMN); lawful intercept (in VPLMN for SM events and interface to LI system); support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF Discovery Requests from NF instances, and provide the information of the discovered NF instances to the NF instances. NRF 725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behavior. The PCF 726 may also implement a front end (FE) to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF 721. The UDM 727 may include two parts, an application FE and a User Data Repository (UDR) (the FE and UDR are not shown by FIG. 7). The UDR may store subscription data and policy data for the UDM 727 and the PCF 726, and/or structured data for exposure and application data (including Packet Flow Descriptions (PFDs) for application detection, application request information for multiple UEs 701) for the NEF 723. The Nudr service-based interface may be exhibited by the UDR to allow the UDM 727, PCF 726, and NEF 723 to access a particular set of the stored data, as well as to read, update (e.g., add, modify), delete, and subscribe to notification of relevant data changes in the UDR. The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identifier handling; access authorization; registration/mobility management; and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, provide access to the Network Capability Exposure (NCE), and interact with the policy framework for policy control. The NCE may be a mechanism that allows the 5GC and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed Network Slice Selection Assistance Information (NSSAI) and the mapping to the Subscribed Single-NSSAIs (S-NSSAIs), if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The CN 720 may also include other elements that are not shown by FIG. 7, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-eir service-based interface exhibited by a 5G-EIR, an N27 reference point between NRF in the visited network and the NRF in the home network, and an N31 reference point between the NSSF in the visited network and the NSSF in the home network.

In yet another example, system 700 may include multiple RAN nodes 711 wherein an Xn interface is defined between two or more RAN nodes 711 (e.g., gNBs and the like) that connect to 5GC, between a RAN node 711 (e.g., gNB) connecting to 5GC 720 and an eNB (e.g., a RAN node 611 of FIG. 6), and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same as or similar to the user plane and/or control plane protocol stack(s) shown and described herein.

Figure 8:
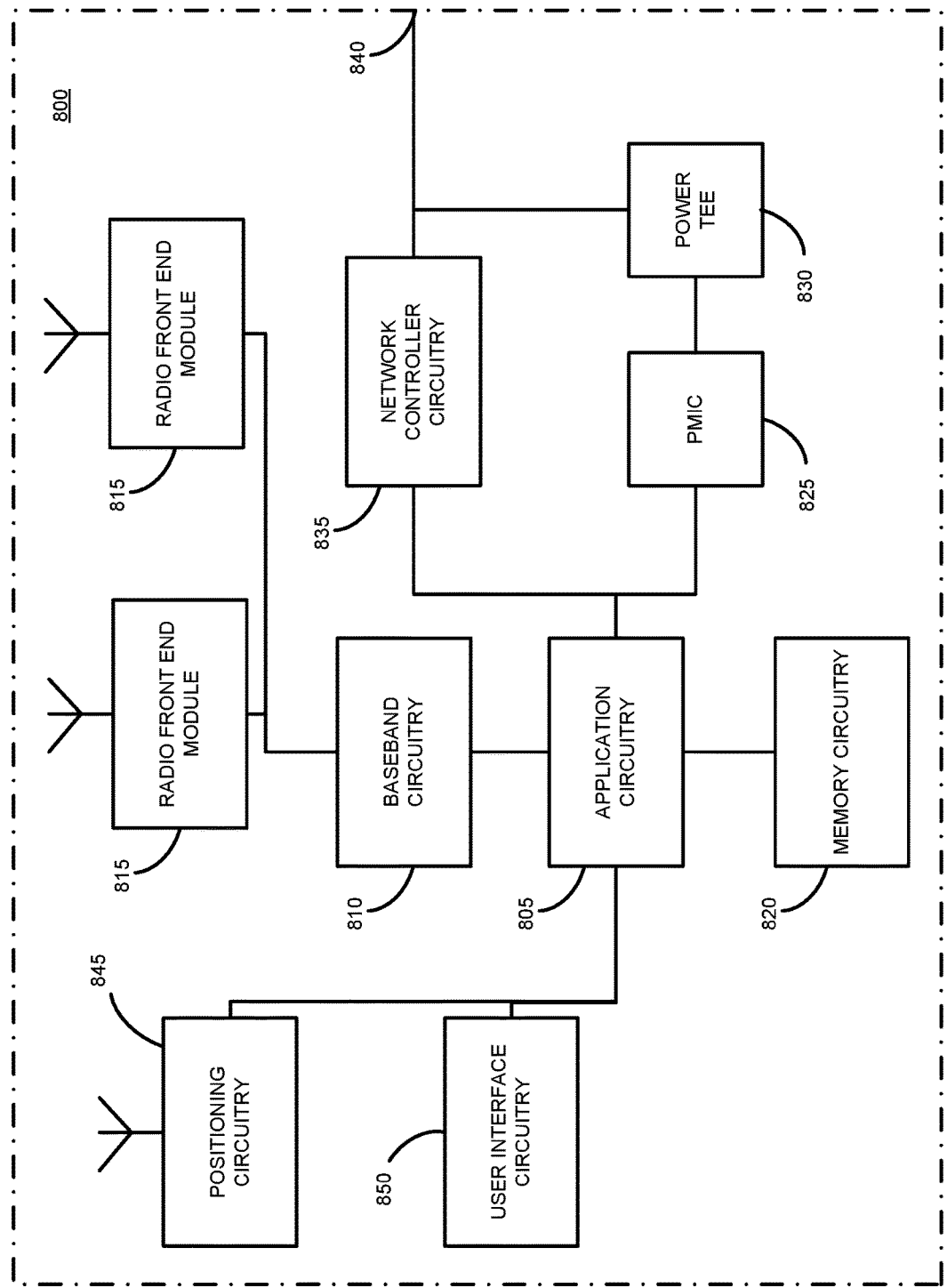
FIG. 8 illustrates an example of an infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node, etc., such as the RAN nodes 611 and 612, and/or AP 606 shown and described previously. In other examples, the system 800 could be implemented in or by a UE, application server(s) 630, and/or any other element/device discussed herein. The system 800 may include one or more of application circuitry 805, baseband circuitry 810, one or more radio front end modules 815, memory circuitry 820, power management integrated circuitry (PMIC) 825, power tee circuitry 830, network controller circuitry 835, network interface connector 840, satellite positioning circuitry 845, and user interface circuitry 850. In some embodiments, the system 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 620 (or CN 720 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 805 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces, and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or 5GC, for example.

Additionally or alternatively, application circuitry 805 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (for example, the radio front end modules 815).

User interface circuitry 850 may include one or more user interfaces designed to enable user interaction with the system 800 or peripheral component interfaces designed to enable peripheral component interaction with the system 800. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocol. In some implementations, the network controller circuitry 835 may include multiple controllers to provide connectivity to other networks using the same or different protocols.

The positioning circuitry 845 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate the over-the-air (OTA) communications to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 601, 602, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToT values for each received GNSS signal from the ToAs and the ToTs, and then may determine, from the ToTs, a three-dimensional (3D) position and clock deviation. The 3D position may then be converted into a latitude, longitude, and altitude. The positioning circuitry 845 may provide data to application circuitry 805 that may include one or more of position data or time data. Application circuitry 805 may use the time data to synchronize operations with other radio base stations (e.g., RAN nodes 611, 612, 711, or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 9:
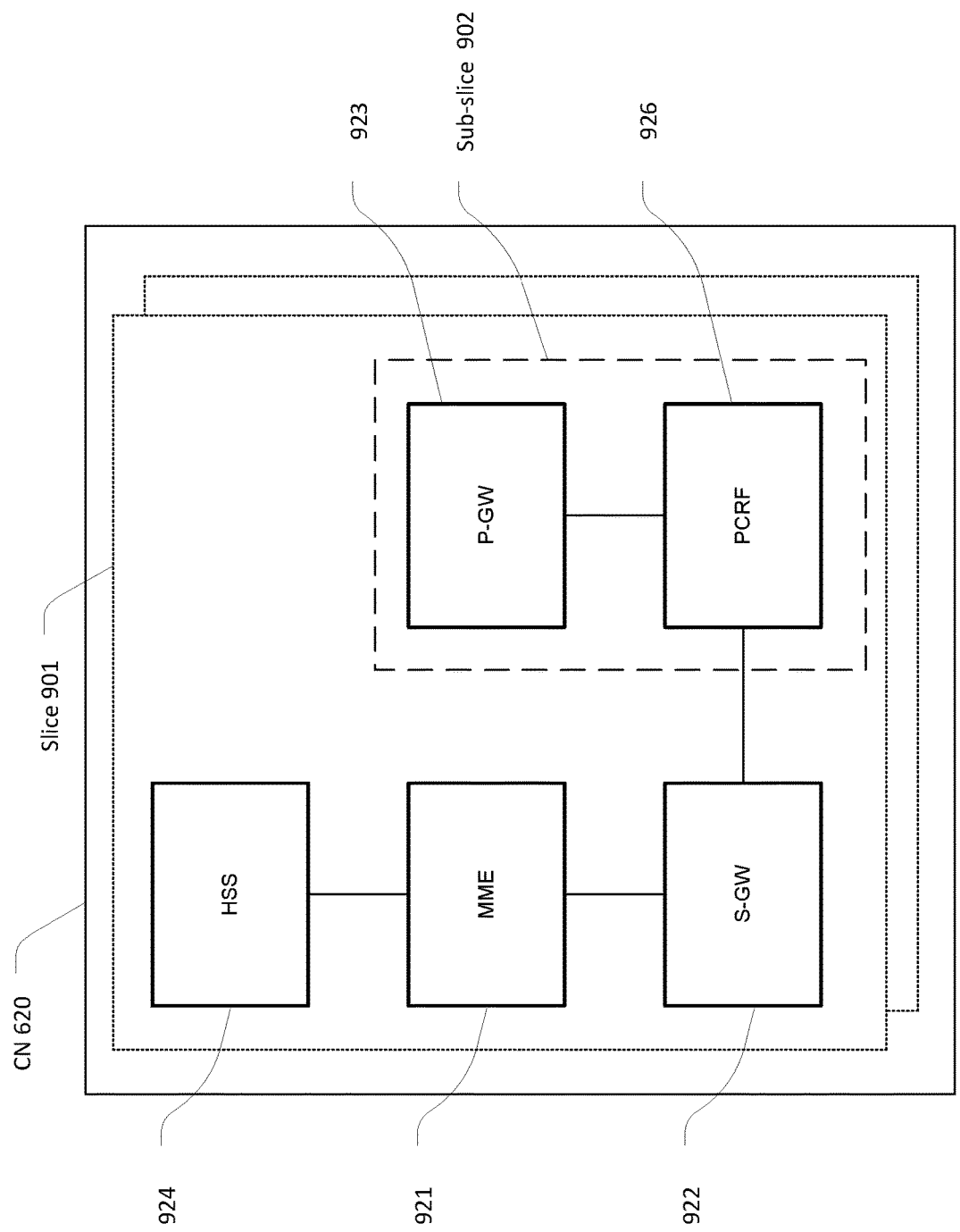
FIG. 9 illustrates components of a core network in accordance with various embodiments.

FIG. 9 illustrates components of a core network in accordance with some embodiments. The components of the CN 620 may be implemented in one physical node or separate physical nodes, including components to read and execute instructions from a machine-readable or computer-readable medium (e.g., a non-transitory machine-readable storage medium). In embodiments, the components of CN 720 may be implemented in a same or similar manner as discussed herein with regard to the components of CN 620. In some embodiments, Network Functions Virtualization (NFV) is utilized to virtualize any or all of the above described network node functions via executable instructions stored in one or more computer-readable storage mediums (described in further detail below). A logical instantiation of the CN 620 may be referred to as a network slice 901, and individual logical instantiations of the CN 620 may provide specific network capabilities and network characteristics. A logical instantiation of a portion of the CN 620 may be referred to as a network sub-slice 902 (e.g., the network sub-slice 902 is shown to include the P-GW 623 and the PCRF 626).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, for example, FIG. 7), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
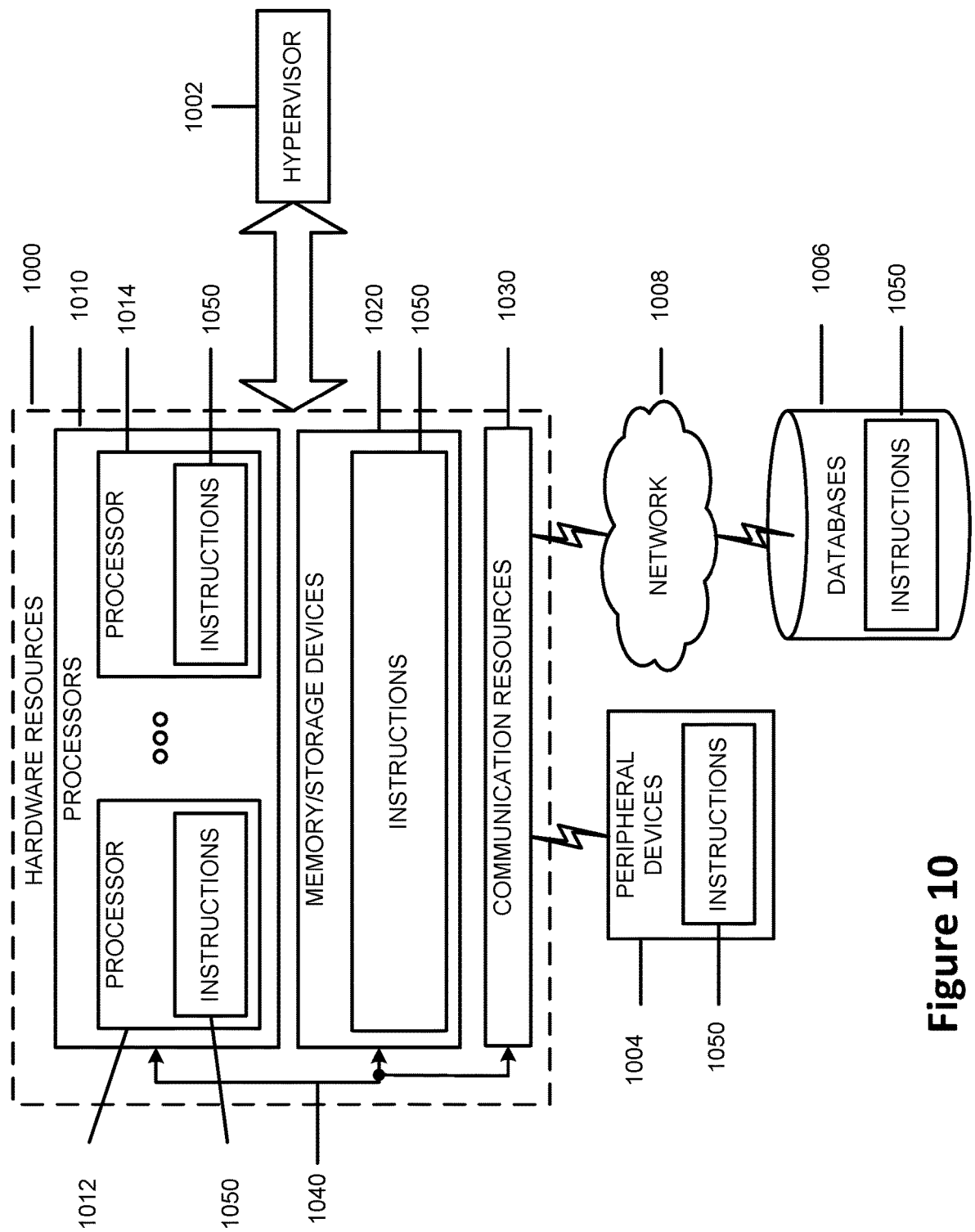
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects, or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

In some embodiments, the electronic device(s), network(s), system(s), chip(s) or component(s), or portions or implementations thereof, of figures herein may be configured to perform one or more processes, techniques, or methods as described herein, or portions thereof.

Some non-limiting Examples of various embodiments are provided below.

Example 1 may include a method comprising: generating or causing to generate an NWDAF message to indicate a temporal validity condition that corresponds to a time to apply quality of service (QoS) handling for a traffic with respect to a protocol data unit (PDU) session; and indicate a spatial validity condition that corresponds to one or more locations to which the QoS handling for the traffic is applied with respect to the PDU session; and causing transmission of the NWDAF message to a policy control function (PCF).

Example 2 may include the method of example 1 and/or some other example herein, wherein the temporal validity condition and the spatial validity condition are based on an AF request for influencing a session management function (SMF) routing decision with respect to the PDU session.

Example 3 may include the method of example 1 and/or some other example herein, further comprising obtaining or causing to obtain load and delay information with respect to the AF based on a plurality of network functions, the plurality of network functions to include a next-generation NodeB (gNB) function, a user plane function, or the AF.

Example 4 may include the method of example 1 and/or some other example herein, wherein the NWDAF message is further to indicate a data network name (DNN) and single network slice selection assistance information (S-NSSAI) to identify traffic with respect to the PDU session.

Example 5 may include the method of example 1 and/or some other example herein, wherein the NWDAF message is further to indicate an AF-service identifier that is issued by the AF with respect to the PDU session.

Example 6 may include the method of example 1 and/or some other example herein, wherein the NWDAF message is further to indicate an identifier of an application that is to handle user plane traffic with respect to the PDU session.

Example 7 may include the method of example 1 and/or some other example herein, wherein the NWDAF message is further to indicate traffic filtering information to detect traffic.

Example 8 may include the method of example 1 and/or some other example herein, further comprising generating or causing to generate an NWDAF transaction identifier (ID).

Example 9 may include the method of example 8 and/or some other example herein, wherein the NWDAF message is further to indicate the NWDAF transaction ID to update or remove an NWDAF request to influence a traffic routing with respect to the PDU session.

Example 10 may include the method of example 9 and/or some other example herein, further comprising invoking or causing to invoke a request service operation to generate an NWDAF request to influence the traffic routing.

Example 11 may include the method of example 1 and/or some other example herein, wherein the NWDAF message is further to indicate individual user equipments (UEs) by generic public subscription identifier (GPSI) or an internet protocol (IP) address or prefix, or a group of UEs by an external-group identifier or internal-group identifier.

Example 12 may include the method of example 1 and/or some other example herein, wherein the NWDAF message is further to indicate quality of service (QoS) parameters that include standardized fifth generation (5G) QoS indicators or non-standardized 5G QoS indicators.

Example 13 may include the method of example 12 and/or some other example herein, wherein the non-standardized 5G QoS indicators include resource type (e.g., GBR or non-GBR), default priority level, packet delay budget, packet error rate, default maximum data burst volume, or default average window.

Example 14 may include the method of example 1 and/or some other example herein, wherein the temporal validity condition corresponds to one or more time periods to apply QoS handling for a traffic with respect to the PDU session.

Example 15 may include the method of examples 1-14 and/or some other example herein, wherein the method is implemented by the NWDAF or an access node of a next-generation radio access network (NG-RAN).

Example 16 may include a method, comprising: processing or causing to process a network data analytics function (NWDAF) message, received from an NWDAF, to identify a temporal validity condition and a spatial validity condition with respect to a protocol data unit (PDU) session; generating or causing to generate a PCF response to the NWDAF based on the NWDAF message; and determining or causing to determine the PDU session is impacted based on the temporal and spatial validity conditions.

Example 17 may include the method of example 16 and/or some other example herein, wherein the PCF response is to create, remove, or update information with respect to the PDU session based on the NWDAF message.

Example 18 may include the method of example 16 and/or some other example herein, further comprising initiating or causing to initiate a network initiated PDU session modification procedure with respect to the PDU session based on the temporal and spatial validity conditions.

Example 19 may include the method of example 18 and/or some other example herein, further comprising determining or causing to determine traffic routing with respect to the PDU session.

Example 20 may include the method of example 16 and/or some other example herein, further comprising receiving or causing to receive the NWDAF message from the NWDAF.

Example 21 may include the method of examples 16-20 and/or some other example herein, wherein the method is implemented by the PCF or an access node of a next-generation radio access network (NG-RAN).

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, and/or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, technique, or process as described in or related to any of examples 1-21, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed by one or more processors, are to:
generate, by a network data analytics function (NWDAF), an NWDAF message to:
indicate a temporal validity condition that corresponds to a time associated with when a quality of service (QoS) handling of traffic applies, or indicate a spatial validity condition that corresponds to one or more locations associated with where the QoS handling of the traffic applies, wherein the NWDAF message includes the temporal validity condition or the spatial validity condition;
send the NWDAF message to a policy control function (PCF); and
generate, by the NWDAF, an NWDAF request to request invocation of a service operation that is to influence the handling of traffic.

2. The one or more non-transitory, computer-readable media of claim 1, wherein the temporal validity condition and the spatial validity condition are based on an application function (AF) request for influencing a session management function (SMF) routing decision with respect to a protocol data unit (PDU) session.

3. The one or more non-transitory, computer-readable media of claim 1, wherein the instructions, when executed, further cause the NWDAF to obtain load and delay information with respect to an application function (AF) based on a plurality of network functions, the plurality of network functions to include a next-generation NodeB (gNB) function, a user plane function, or the AF.

4. The one or more non-transitory, computer-readable media of claim 1, wherein the NWDAF message is further to indicate a data network name (DNN) and single network slice selection assistance information (S-NSSAI) to identify traffic with respect to a protocol data unit (PDU) session.

5. The one or more non-transitory, computer-readable media of claim 1, wherein the NWDAF message is further to indicate an AF-service identifier that is issued by the AF with respect to a PDU session.

6. The one or more non-transitory, computer-readable media of claim 1, wherein the NWDAF message is further to indicate an identifier of an application that is to handle user plane traffic with respect to a protocol data unit (PDU) session.

7. The one or more non-transitory, computer-readable media of claim 1, wherein the NWDAF message is further to indicate traffic filtering information to detect traffic.

8. The one or more non-transitory, computer-readable media of claim 1, wherein the instructions, when executed, further cause the NWDAF to:
generate an NWDAF transaction identifier (ID); and
generate the NWDAF message to further indicate the NWDAF transaction ID to update or remove an NWDAF request to influence a traffic routing with respect to a PDU session.

9. The one or more non-transitory, computer-readable media of claim 1, wherein the NWDAF message is further to indicate individual user equipments (UEs) by generic public subscription identifier (GPSI) or an internet protocol (IP) address or prefix, or a group of UEs by an external-group identifier or internal-group identifier.

10. The one or more non-transitory, computer-readable media of claim 1, wherein the NWDAF message is further to indicate quality of service (QoS) parameters that include standardized fifth generation (5G) QoS indicators or non-standardized 5G QoS indicators.

11. One or more non-transitory, computer-readable media having instructions that, when executed by one or more processors are to:
process, by a policy control function (PCF), a network data analytics function (NWDAF) message, received from an NWDAF, to identify a temporal validity condition and a spatial validity condition with respect to a protocol data unit (PDU) session, wherein the temporal validity condition is associated with when a quality of service (QoS) handling of traffic applies, wherein the spatial validity condition corresponds to one or more locations associated with where the QoS handling of traffic applies, and wherein the NWDAF message includes the temporal validity condition or the spatial validity condition;
generate, by the PCF, a PCF response to the NWDAF based on the NWDAF message; and
determine, by the PCF, the PDU session is impacted based on the temporal and spatial validity conditions.

12. The one or more non-transitory, computer-readable media of claim 11, wherein the PCF response is to create, remove, or update information with respect to the PDU session based on the NWDAF message.

13. The one or more non-transitory, computer-readable media of claim 11, wherein the instructions, when executed, further cause the
PCF to initiate a network initiated PDU session modification procedure with respect to the PDU session based on the temporal and spatial validity conditions.

14. The one or more non-transitory, computer-readable media of claim 13, wherein the instructions, when executed, further cause the PCF to determine traffic routing with respect to the PDU session.

15. An apparatus to be implemented in an access node of a next-generation radio access network (NG-RAN), the apparatus comprising:
memory circuitry; and
processing circuitry, coupled with the memory circuitry, the processing circuitry to:
generate a network data analytics function (NWDAF) message to indicate a temporal validity condition that corresponds to one or more time periods to apply quality of service (QoS) handling of a traffic with respect to a protocol data unit (PDU) session and a spatial validity condition that corresponds to one or more locations to which the QoS handling of the traffic is applied with respect to the PDU session, wherein the NWDAF message includes the temporal validity condition or the spatial validity condition;
transmit the NWDAF message to a policy control function (PCF); and
generate an NWDAF request to request invocation of a service operation that is to influence the handling of traffic.

16. The apparatus of claim 15, wherein the processing circuitry is further to receive a policy control function (PCF) response message for the NWDAF message.

17. The apparatus of claim 15, wherein the processing circuitry is further to transmit the NWDAF message to a session management function (SMF).

18. The apparatus of claim 15, wherein the NWDAF message includes an NWDAF request for the PCF to request service operation and an NWDAF transaction identifier (ID).

19. An apparatus of processing circuitry corresponding to a policy control function (PCF), comprising:
means for receiving a network data analytics function (NWDAF) message that indicates a temporal validity condition and spatial validity condition with respect to a protocol data unit (PDU) session, wherein the temporal validity condition corresponds to a time associated with when a quality of service (QoS) handling of traffic applies, and the spatial validity condition that corresponds to one or more locations associated with where the QoS handling of the traffic applies;
means for processing the NWDAF message;
means for determining the PDU session is impacted based on the processed NWDAF message; and
means for initiating a network initiated PDU session modification procedure with respect to the PDU session based on the temporal and spatial validity conditions.

20. The apparatus of claim 19, further comprising means for generating a PCF response to the NWDAF based on the NWDAF message.

* * * * *